United States Patent
Levitan et al.

[11] Patent Number: 5,848,127
[45] Date of Patent: Dec. 8, 1998

[54] TWO-WIRE CHANNEL UNIT WITH LOOPBACK TEST CAPABILITY

[75] Inventors: Dmitry Levitan, Fairfax; Winston M. Gadsby, Herndon, both of Va.

[73] Assignee: Hubbell Incorporated, Orange, Conn.

[21] Appl. No.: 633,971

[22] Filed: Apr. 19, 1996

Related U.S. Application Data

[63] Continuation-in-part of Ser. No. 626,063, Apr. 1, 1996, abandoned.

[51] Int. Cl.$^6$ .............................. H04M 1/24; H04M 3/08
[52] U.S. Cl. .................................. 379/5; 379/1; 379/26; 379/29; 370/249
[58] Field of Search .................. 379/1, 2, 3, 5, 379/26, 27, 30, 29, 22, 23, 24; 370/249, 250, 251

[56] References Cited

U.S. PATENT DOCUMENTS

| | | | |
|---|---|---|---|
| 4,560,842 | 12/1985 | Homer | 379/29 |
| 5,003,573 | 3/1991 | Agah et al. | 379/27 |
| 5,018,184 | 5/1991 | Abrams et al. | 379/29 |
| 5,111,497 | 5/1992 | Bliven et al. | 379/27 |
| 5,121,420 | 6/1992 | Marr et al. | 379/26 |
| 5,425,075 | 6/1995 | Selden et al. | 379/10 |
| 5,438,606 | 8/1995 | Cerulli | 379/24 |
| 5,677,941 | 10/1997 | Rice | 379/5 |
| 5,717,736 | 2/1998 | Vulih et al. | 379/3 |
| 5,768,341 | 6/1998 | Pryor et al. | 379/22 |

OTHER PUBLICATIONS

Pulsecom Technical Manual, Practice Section 1306, "4–Wire, 600–Ohm Transmission Only Channel Unit with Loopback Model 4TOLB–3L1" (Doc. Issue 2, May 1992, pp. 1–11).

Pulsecom Technical Manual, Practice Section 1284, "2–Wire Transmission Only Channel Unit Model 2TO–1L2" (Doc. Issue 2, Jan. 1991, pp. 1–9).

Exar XR–T2713 Loopback Detector, pp. 2–138 through 2–140 (not dated).

*Telecommunications Transmission Engineering*, Third Edition, vol. 1, p. 678, (Bellcore, 1990).

*Primary Examiner*—Curtis A. Kuntz
*Assistant Examiner*—Rexford Barnie
*Attorney, Agent, or Firm*—Jerry M. Presson; John E. Holmes

[57] ABSTRACT

A two-wire channel unit or line card for use in a digital loop carrier (DLC) telephone system is disclosed. The channel unit is provided with a loopback test capability by using relays to open-circuit or short-circuit the input terminals of the hybrid circuit that couples the two-wire subscriber line to the separate two-wire transmit and receive paths within the channel unit. When open-circuited or short-circuited in this manner, the hybrid circuit couples voice frequency test signals between the receive and transmit paths of the channel unit, thereby allowing loopback testing to be carried out without providing a dedicated loss/gain circuit in the channel unit. An additional relay may be provided to vary the gain of an amplifier stage in the transmit or receive path of the channel unit during operation in the loopback test mode, in order to control the overall gain of the channel unit during loopback testing.

22 Claims, 5 Drawing Sheets

TWO-WIRE CHANNEL UNIT WITH LOOPBACK TEST CAPABILITY

This application is a continuation-in-part of prior U.S. Patent Application Ser. No. 08/626,063, filed by Dmitry Levitan and Winston M. Gadsby on Apr. 1, 1996 and entitled "Two-Wire Channel Unit With Loopback Test Capability", now abandoned.

FIELD OF THE INVENTION

The present invention relates generally to the field of telecommunications. More specifically, the invention relates to a two-wire channel unit or line card for use in a digital loop carrier (DLC) telephone system, with a loopback testing capability being provided in the channel unit or line card to allow diagnostic testing to be carried out from a remote location.

BACKGROUND OF THE INVENTION

In digital loop carrier (DLC) telephone systems, the ability to carry out remote testing of the channel units or line cards in a remote terminal (RT) is an important diagnostic tool. In four-wire channel units (i.e., channel units serving four-wire subscriber lines having two tip conductors and two ring conductors each), a loopback testing capability has been available for some time. The channel unit is placed into the loopback test mode by means of a special tone (typically having a frequency of 2713 Hz) which is generated remotely from the central office terminal (COT). The amplitude of the tone is high enough to avoid false activation by normal voice signals. In response to the tone, a logic circuit within the channel unit operates relays which reconfigure the channel unit by disconnecting all four subscriber line conductors (T, R, T1 and R1) and internally connecting the transmit and receive paths of the channel unit to each other through a calibrated gain/loss network. This allows the channel unit to be tested from the far end, since a test signal sent from the COT will be returned back to the COT through the gain/loss network. The gain/loss network is configured to maintain the signal amplitude or transmission level point (TLP) at its nominal value during operation of the channel unit in the loopback mode. By measuring the returned test signal, an operator at the COT can verify that the channel unit at the RT is performing correctly. The loopback mode can be disabled by sending the 2713 Hz tone again, or by allowing a predetermined time period (typically 4 or 20 minutes) to expire. Manual activation and deactivation of the loopback testing mode is also possible in some four-wire channel units.

Two-wire channel units are available for use with two-wire subscriber lines having one tip (T) and one ring (R) conductor each. To date, however, a loopback testing capability has not been available in two-wire channel units. In principle, it would be possible to implement loopback testing in a two-wire channel unit by adding a gain/loss circuit to selectively interconnect the transmit and receive paths of the channel unit during loopback operation, as in the case of four-wire channel units. However, given that two-wire channel units are used for less demanding subscriber applications where cost is a more important factor, the need for a dedicated gain/loss network is undesirable. The presence of a gain/loss network in the channel unit can also be expected to decrease its reliability, and the need to calibrate the gain/loss network when the channel unit is installed introduces an undesirable degree of complexity.

SUMMARY OF THE INVENTION

A primary object of the present invention is to provide a two-wire channel unit with a loopback testing capability which is equivalent to that previously available in four-wire channel units, without introducing any unnecessary degree of complexity into the two-wire channel unit.

A further object of the present invention is to use the hybrid network of a two-wire channel unit, an existing channel unit component which couples the two-wire subscriber line to the separate transmit and receive paths within the channel unit, to couple the transmit and receive paths of the channel unit to each other during loopback testing.

A still further object of the present invention is to provide a two-wire channel unit with a loopback test circuit which selectively varies the gain or attenuation of either the transmit path or the receive path within the channel unit, so that the desired overall gain or attenuation is obtained when these two paths are coupled to each other during loopback testing.

In accordance with one aspect of the present invention, a two-wire channel unit for use in a digital loop carrier telecommunications system comprises a two-wire subscriber line interface for connecting the channel unit to a two-wire subscriber line; a common equipment interface for connecting the channel unit to channel bank common equipment in a digital loop carrier channel bank; a processing circuit connected to the common equipment interface for converting signals from the subscriber line to a format suitable for the channel bank common equipment, and for converting signals from the channel bank common equipment to a format suitable for the analog subscriber line; a hybrid circuit having a two-wire transmit/receive port, a two-wire transmit port, and a two-wire receive port, with the two-wire transmit/receive port being connected to the two-wire subscriber line interface; a transmit circuit connected between the two-wire transmit port of the hybrid circuit and an input of the processing circuit; a receive circuit connected between an output of the processing circuit and the two-wire receive port of the hybrid circuit; and a loopback circuit for coupling test signals from the receive circuit to the transmit circuit through the hybrid circuit when the channel unit is placed in a loopback test mode.

In a preferred embodiment of the invention, the hybrid circuit is preferably of the type which prevents signals from being coupled from the two-wire receive port to the two-wire transmit port when a characteristic impedance is coupled to the two-wire transmit/receive port, and the loopback circuit is operative in the loopback test mode of the channel unit to change the impedance coupled to the two-wire transmit/receive port of the hybrid circuit to an impedance value at which test signals can be coupled from the two-wire receive port to the two-wire transmit port. The impedance value may be equivalent to an open circuit at the two-wire transmit/receive port of the hybrid circuit, or to a short circuit across the transmit/receive port of the hybrid circuit. In either case, relays can be used to establish the required open-circuit or short-circuit condition at the transmit/receive port of the hybrid circuit. Energization of the relay coils may be controlled by a conventional loopback detector of the type already used in four-wire channel units.

In accordance with another aspect of the present invention, a two-wire channel unit for use in a digital loop carrier telecommunications system comprises a two-wire subscriber line interface for connecting the channel unit to a two-wire subscriber line; a common equipment interface for connecting the channel unit to channel bank common equipment in a digital loop carrier bank; a processing circuit connected to the common equipment interface for converting signals from the subscriber line to a format suitable for the channel bank common equipment, and for converting signals from the channel bank common equipment to a format suitable for the subscriber line; a hybrid circuit having a two-wire transmit/receive port, a two-wire transmit port, and a two-wire receive port, with the two-wire transmit/receive port being connected to the two-wire subscriber line interface; a transmit circuit connected between the two-wire transmit port of the hybrid circuit and an input of the processing circuit; a receive circuit connected between an output of the processing circuit and the two-wire receive port of the hybrid circuit; and a loopback circuit for coupling test signals from the receive circuit to the transmit circuit when the channel unit is placed in a loopback mode. At least one of the transmit and receive circuits has a selectively variable gain, and the loopback circuit is connected to the variable-gain transmit or receive circuit and to selectively vary the gain of the circuit when the channel unit is placed in the loopback test mode. In a preferred embodiment of the invention, the transmit or receive circuit whose gain is selectively varied comprises an amplifier having a resistive feedback loop, and the loopback circuit is operative to change the resistance value of the resistive feedback loop when the channel unit is placed in the loopback test mode.

The present invention is also directed to a method for implementing loopback testing in a two-wire channel unit having a hybrid circuit for coupling a two-wire subscriber line to separate two-wire transmit and receive circuits in the channel unit. The hybrid circuit has two-wire transmit/receive port for connection to the two-wire subscriber line, and normally prevents signals from being coupled from the receive circuit of the channel unit to the transmit circuit of the channel unit when a characteristic impedance is coupled to the transmit/receive port of the hybrid circuit. The inventive method comprises the step of placing the two-wire channel unit in a loopback test mode by changing the impedance coupled to the transmit/receive port of the hybrid circuit to an impedance value at which test signals can be coupled from the receive circuit to the transmit circuit through the hybrid circuit. This allows loopback testing to be carried out through the hybrid circuit itself, without requiring a dedicated gain/loss circuit. In a preferred embodiment of the invention, the method may further comprise the step of changing the gain of at least one of the transmit and receive circuits of the channel unit when the channel unit is placed in the loopback testing mode.

BRIEF DESCRIPTION OF THE DRAWINGS

Referring now to the drawings, which form a part of the original disclosure.

DETAILED DESCRIPTION OF THE PREFERRED EMBODIMENTS

Figure 1:
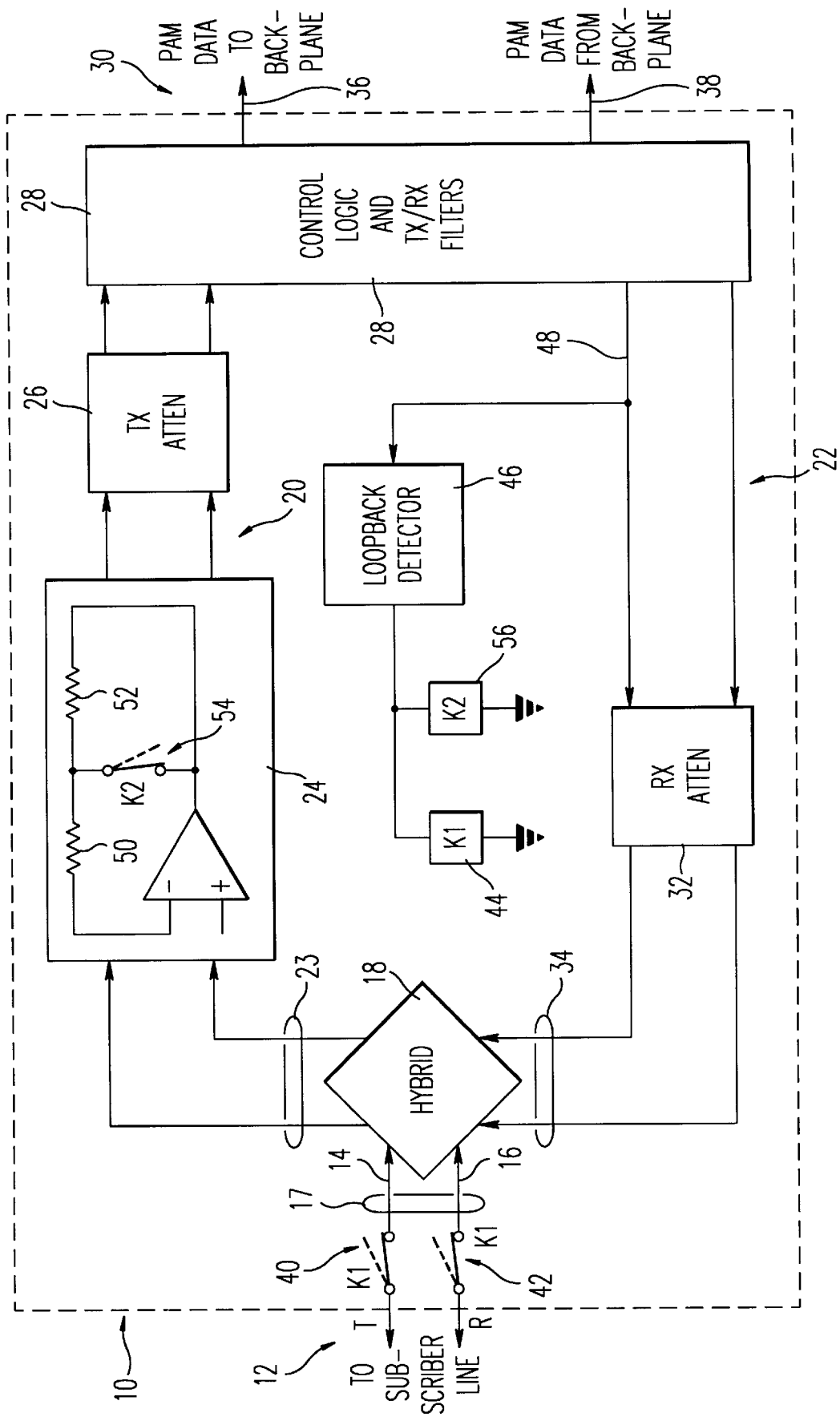
FIG. 1 is a block diagram of a two-wire channel unit which incorporates a loopback test circuit in accordance with a preferred embodiment of the present invention.

A two-wire channel unit or line card 10 employing the novel loopback circuitry of the present invention is illustrated in FIG. 1. The purpose of the channel unit 10, which is preferably provided in the form of a plug-in card that can be installed in a remote terminal (RT) or central office terminal (COT) of a digital loop carrier (DLC) system, is to provide a connection between the common equipment of the DLC channel bank and an individual two-wire subscriber line. A two-wire subscriber line interface 12 connects the channel unit 10 to a two-wire analog subscriber line, the latter consisting of a tip (T) conductor 14 and a ring (R) conductor 16. The analog subscriber line will typically be connected to a conventional telephone (not shown) located at the subscriber's premises, although other types of subscriber equipment (such a computer modems, facsimile machines, radio equipment and the like) may also be present. The tip and ring conductors 14 and 16 of the subscriber line are coupled to the two-wire transmit/receive port 17 of a hybrid circuit 18, which functions as a two-to-four wire converter for coupling the two-wire subscriber interface 12 to the separate two-wire transmit and receive paths 20 and 22 within the channel unit. The transmit path is coupled to the transmit port 23 of the hybrid circuit 18 and comprises an amplifier stage 24 and a transmit attenuator 26 connected in series, with the output of the transmit attenuator 26 coupled to the input of a control logic and filter unit 28. The control logic and filter unit 28 provides an interface 30 between the channel unit 10 and the backplane conductors leading to the common equipment of the channel bank. Outputs from the control logic and filter unit 28 are connected to the input of a receive attenuator 32, the outputs of which are connected to the two-wire receive port 34 of the hybrid circuit 18.

In operation, analog voice-frequency signals in the voice band of 300 Hz to 3,000 Hz originate from the subscriber interface 12 and are routed by the hybrid circuit 18 through the transmit path 20 to the control logic and filter unit 28, where pulse amplitude modulation (PAM) is carried to convert the analog voice signals to the proper format for processing by the channel bank common equipment. The PAM signals are output to the channel bank backplane on lines 36, and undergo pulse code modulation (PCM) in the channel bank common equipment for conversion to the T1 digital format used in DLC telephone systems. In a similar manner, PCM signals received from a remote site are converted by the channel bank common equipment to PAM format and are sent to the control logic and filter unit 28 of the channel unit 10 over input lines 38. The control logic and filter unit 28 converts the received PAM signals to analog voice signals and couples them to the two-wire subscriber line interface 12 through the receive path 22 and the hybrid circuit 18. The function of the hybrid circuit 18 is to ensure that voice frequency signals that are sent over the receive path 22 are coupled only to the subscriber interface 12 and not to the transmit path 20, and to ensure that voice frequency signals originating at the subscriber interface 12 are routed only to the transmit path 20 and not to the receive path 22. This occurs when the transmit/receive port 17 of the hybrid circuit 18 is terminated by the nominal or characteristic AC impedance value for which it was designed, typically 600 ohms or 900 ohms in series with a capacitance of 2.2 microfarads.

The present invention takes advantage of the fact that the hybrid circuit 18, when terminated at the transmit/receive port 17 by an impedance much greater (or much less) than the nominal impedance for which it was designed, will provide coupling (rather than isolation) between the receive port 34 and the transmit port 23 for test signals in the voice band. Maximum coupling will occur when the terminating impedance at the transmit/receive port 17 is either infinite (i.e., an open circuit exists in at least one of the tip and ring conductors 14 and 16) or zero (i.e., a short circuit exists between the tip and ring conductors 14 and 16). For the purposes of the present invention, an open-circuit condition is preferred and is implemented on both the tip and ring conductors 14 and 16. This provides complete isolation between the subscriber equipment and the channel unit 10 during loopback testing. To achieve the desired open-circuit condition, two sets of relay contacts 40 and 42 are employed, with the relay contacts 40 interrupting the tip conductor 14 and the relay contacts 42 interrupting the ring conductor 16. Both sets of relay contacts 40 and 42 are normally in the closed (conducting) position and are operated by the same relay coil 44. The relay coil 44 is connected to the output of a loopback detector 46, the input of which is coupled to an input line 48 of the receive attenuator 32. The loopback detector 46 energizes the relay coil 44 when a 2713 Hz loopback test initiation tone (originated from a remote site and routed to the channel unit 10 by the channel bank common equipment) is detected on line 48. The loopback detector 46 de-energizes the relay coil 44 on the next occurrence of the loopback test initiation tone, or after a preset time interval of 4 or 20 minutes, whichever occurs first. During the interval in which the relay coil 44 is energized, the relay contacts 40 and 42 are moved to the open (nonconducting) position to open-circuit the transmit/receive port 17 of the hybrid circuit 18 and isolate the subscriber equipment. This, in turn, causes the hybrid circuit 18 to couple voice frequency test signals (typically consisting of 1 KHz sinusoidal tones) received from a remote testing site via the receive path 22 to the transmit path 20, thereby allowing loopback testing to be carried out from a central office terminal (COT) or other remote site. When the loopback test is terminated, the relay contacts 40 and 42 are restored to their closed (conducting) positions and the hybrid circuit 18 resumes its normal function in the channel unit 10.

During normal operation of the channel unit 10, the transmit path 20 and the receive path 22 are typically characterized by certain amounts of gain or attenuation that depend upon the nature of the subscriber equipment and the length of the subscriber loop. During loopback testing, it is desired to replicate the normal signal levels in the transmit and receive paths 20 and 22 so that the overall gain or attenuation of the test signal as it passes through the channel unit 10 is at its nominal value. To achieve this, the amplifier stage 24 in the transmit path 20 of the channel unit 10 is provided with a variable gain by using two feedback resistors 50 and 52, with the resistor 52 being shorted (and thus removed from the feedback loop) by normally-closed relay contacts 54 when the channel unit 10 is not operating the loopback test mode. The relay contacts 54 are operated by a second relay coil 56 which is connected in parallel with the first relay coil 44 at the output of the loopback detector 46. When the channel unit 10 is placed in the loopback test mode by the appearance of the loopback test initiation signal on line 48, the relay coils 44 and 56 are energized simultaneously. Energization of the relay coil 56 causes the relay contacts 54 to open, thereby adding the resistance 52 to the resistance 50 in the feedback loop of the amplifier stage. The resulting increase in the gain of the amplifier stage 24 maintains the desired level of the test signal through the channel unit 10 during loopback testing.

Figure 2:
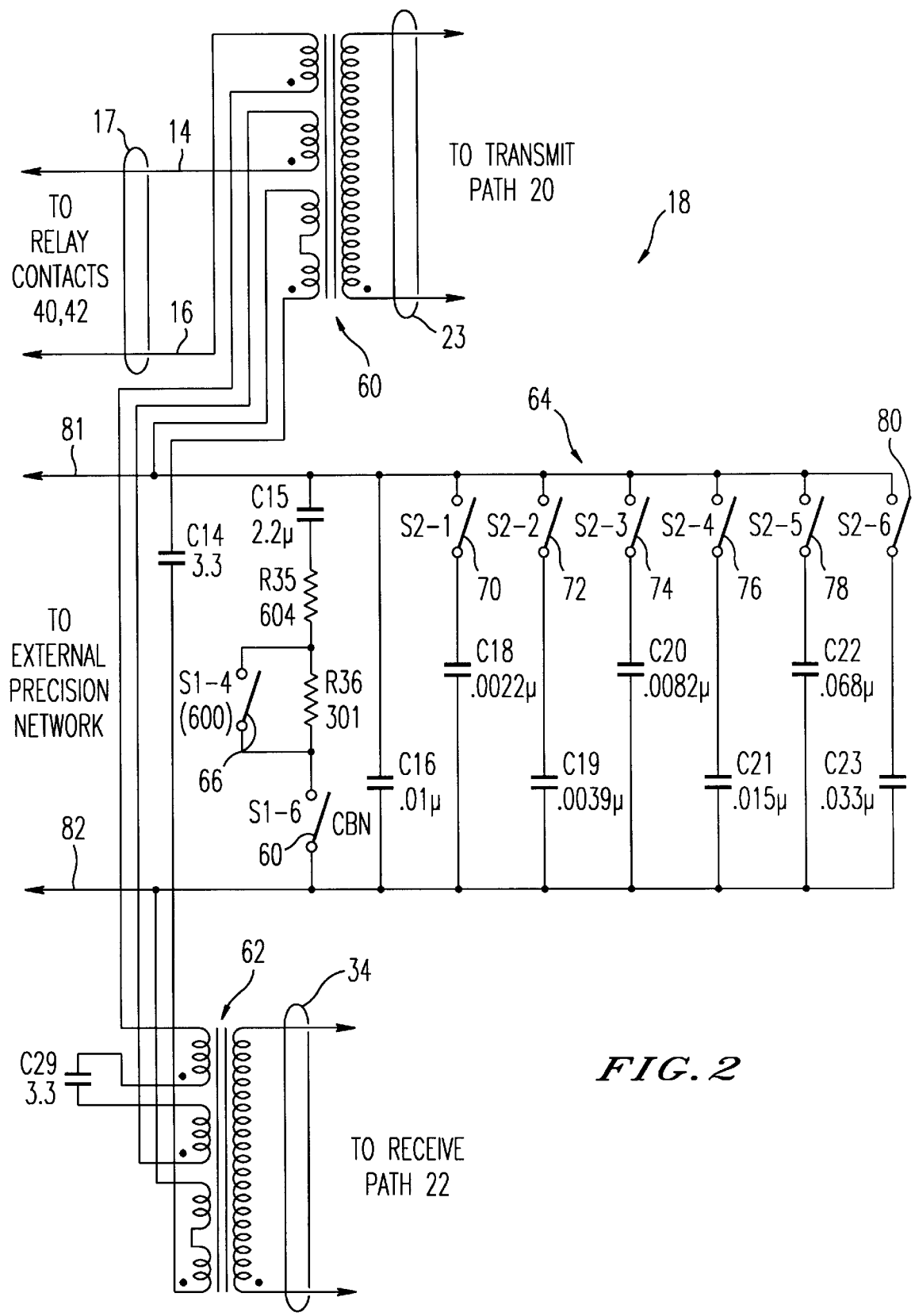
FIG. 2 is a schematic diagram of an exemplary hybrid circuit which may be used in the two-wire channel unit of FIG. 1.

FIG. 2 illustrates, merely by way of example, one type of hybrid circuit 18 that may be used in the practice of the present invention. The tip and ring conductors 14 and 16 are coupled in the manner shown to the primary windings of tapped transformers 60 and 62. The secondary windings of the transformers 60 and 62 correspond to the transmit and receive ports 23 and 34, respectively, of the hybrid circuit 18. A switched network 64 of resistors and capacitors is coupled to other taps on the primary windings of the transformers 60 and 62. By opening and closing various combinations of the switches 66–80 (which are preferably provided as DIP switches on the circuit board of the channel unit 10), the hybrid circuit 18 can be balanced to match the length of the metallic loop between the channel unit 10 and the subscriber equipment. If desired, balancing of the hybrid circuit 18 can also be carried out by connecting an external resistor-capacitor network to the terminals 81 and 82. It will be observed from FIGS. 1 and 2 that the transformers 60 and 62 of the hybrid circuit 18 are included in the test signal path during loopback testing. Therefore, in contrast to prior four-wire loopback testing arrangements in which the output transformers are isolated during the loopback test, proper operation of the hybrid transformers 60 and 62 can be verified during the loopback test of the present invention.

Figure 3:
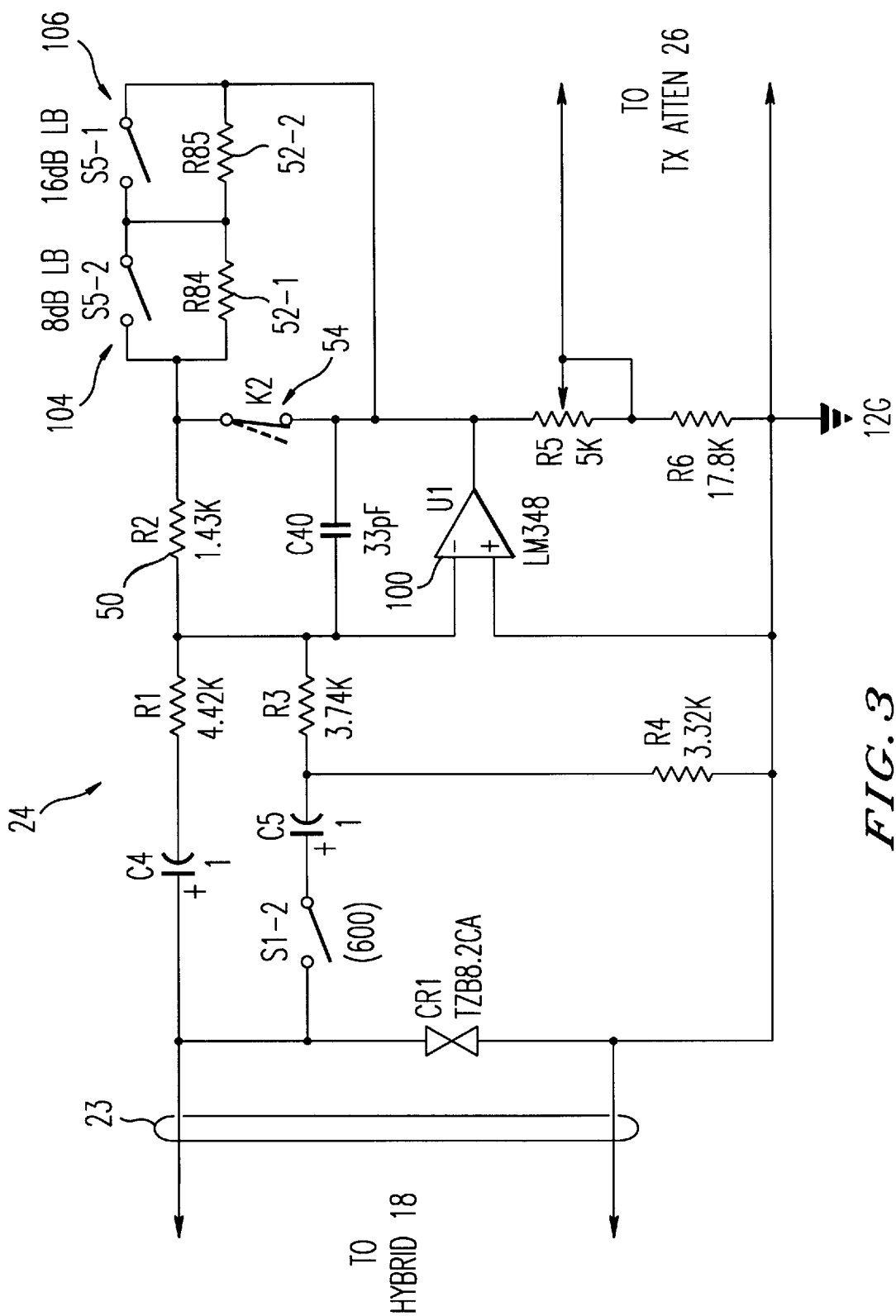
FIG. 3 is a schematic diagram of a variable-gain transmit circuit stage which may be used in the two-wire channel unit of FIG. 1.

FIG. 3 is a schematic diagram of a transmit amplifier stage 24 which may be used in the channel unit 10 of FIG. 1. The active element of the amplifier stage 24 is an operational amplifier 100, the feedback loop of which includes resistors 50, 52-1 and 52-2. The resistors 52-1 and 52-2 are connected to each other in series, and together correspond to the resistor 52 shown in FIG. 1. During normal (i.e., non-loopback) operation of the channel unit 10, the relay contacts 54 are closed to provide a short circuit across the portion of the feedback loop which includes the series-connected resistors 52-1 or 52-2, thereby removing the resistors 52-1 and 52-2 from the feedback loop. When the relay contacts 54 open as a result of the channel unit 10 being placed in the loopback test mode, the resistor 52-1 or 52-2 (depending upon the states of DIP switches 104 and 106) is placed in series with the feedback resistor 50. This increases the total resistance in the feedback loop of the amplifier 100, thereby increasing the gain of the transmit amplifier stage 24 as a whole. During initial installation of the channel unit 10, the DIP switches 104 and 106 are set to produce the desired gain in the transmit path 20 of the channel unit during loopback operation. If both switches are closed, no additional gain results during loopback operation. For the resistance values shown, opening of the switch 104 increases the loopback gain by 8 dB, and opening of the switch 106 increases the loopback gain by 16 dB.

Figure 4:
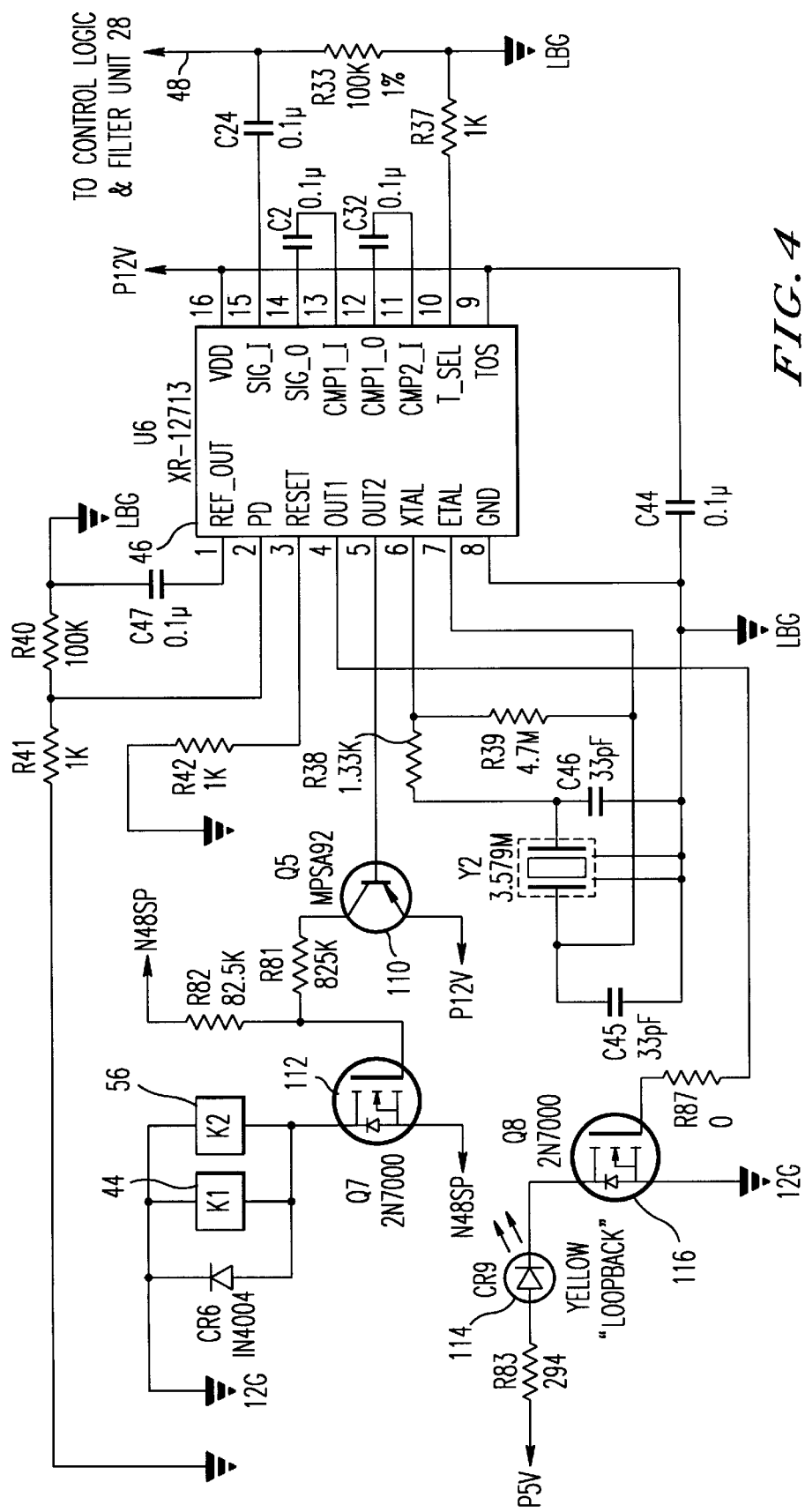
FIG. 4 is a schematic diagram of a loopback detector and relay actuation circuit which may be used in the two-wire channel unit of FIG. 1.

FIG. 4 is a schematic diagram illustrating the manner in which the loopback detector 46 of FIG. 1 is used to operate the relay coils 44 and 56. The loop detector 46 is a commercially available Exar XR-T2713 integrated circuit, and hence its construction and operation need not be described in detail. The loopback test initiation tone is sensed on line 48 by the SIG_I input of the loopback detector 46, causing the output line OUT1 to transition to a high logic state and the output line OUT2 to transition to a low logic state. The transition of the OUT2 output line to a low logic state is used to simultaneously energize the two relay coils 44 and 56 through a driver circuit comprising a bipolar transistor 110 and a field-effect transistor (FET) 112. The output line OUT1 is used to illuminate a light-emitting diode (LED) 114 through a FET driver 116 whenever the relay coils 44 and 56 are energized. The LED 114 is mounted on the front panel of the channel unit 10 and indicates, when illuminated, that the channel unit is in the loopback test mode.

Figure 5:
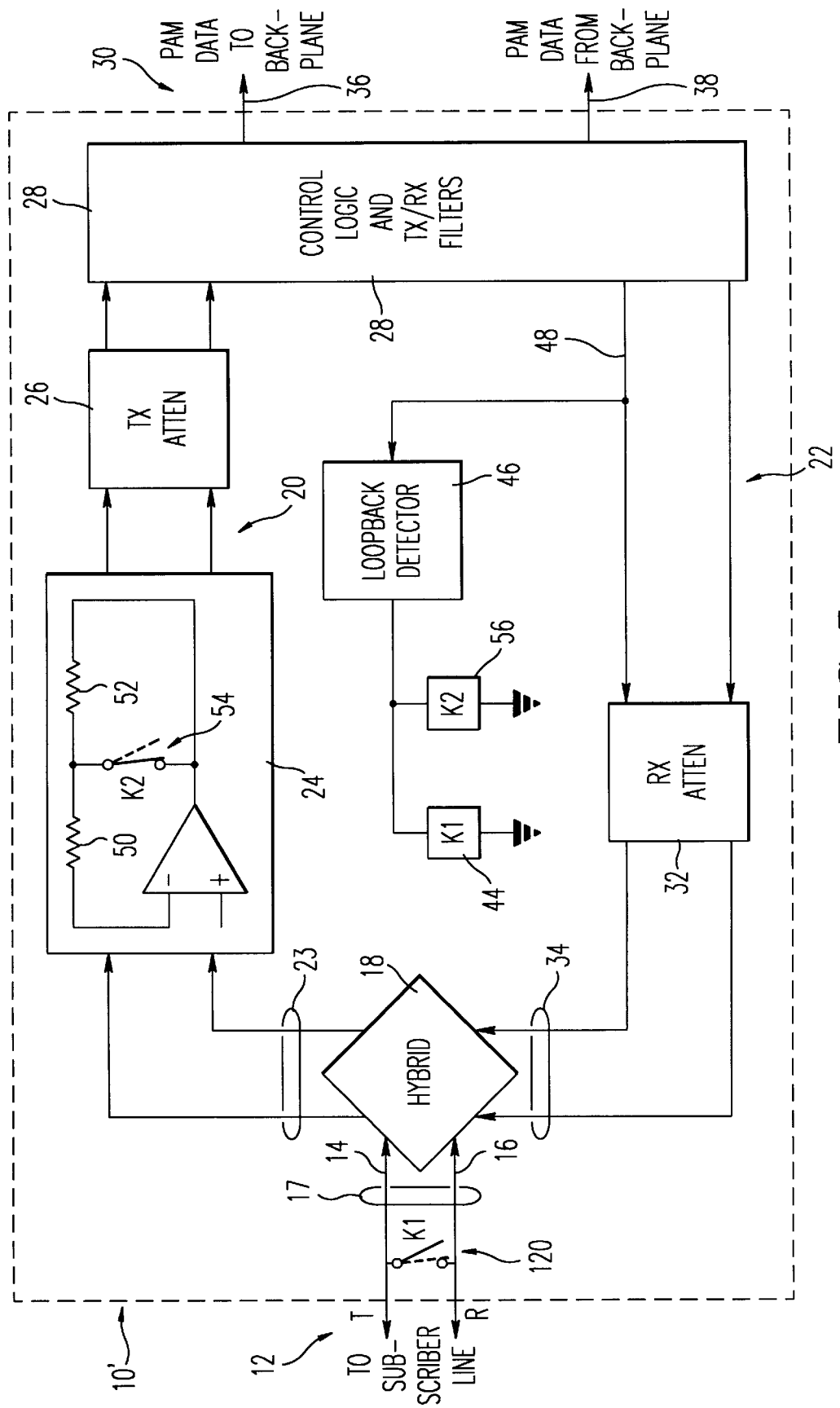
FIG. 5 is a block diagram of a modified embodiment of the two-wire channel unit of FIG. 1.

FIG. 5 is a block diagram which illustrates a modified version 10' of the two-wire channel unit 10 of FIG. 1. In the modification, the two sets of normally-closed relay contacts 40 and 42 are replaced by a single set of relay contacts 120 which are normally open when the channel unit 10' is operating in the non-loopback mode. When the channel unit is placed into the loopback test mode, the relay coil 44 closes the relay contacts 120 to produce a short circuit across the transmit/receive port 17 of the hybrid circuit 18. This causes the hybrid circuit 18 to couple voice frequency test signals from the receive path 22 of the channel unit 10' to the transmit path 20 of the channel unit 10', in essentially the same manner as in the embodiment of FIG. 1.

It will be appreciated that the impedance coupled to the transmit/receive port 17 of the hybrid circuit 18 in FIGS. 1 and 5 need not be equivalent to an open circuit or a short circuit in order to provide the desired test signal coupling through the hybrid circuit 18 during loopback testing. On the contrary, as long as the applied impedance is sufficiently different from the nominal or characteristic impedance for which the hybrid circuit 18 is designed to allow a usable signal to be coupled from the receive path 22 of the channel unit to the transmit path 20, loopback testing can be carried out. In general, the return loss at the two-wire port of a hybrid (i.e., at the transmit/receive port 17 in the present example) is given by the following formula:

$$\text{Return loss} = 20 \log_{10} \left[ \frac{Z_1 + Z_2}{Z_1 - Z_2} \right] \text{dB}$$

See *Telecommunications Transmission Engineering*, Third Edition, Volume 1, page 678 (Bellcore, 1990), incorporated herein by reference. $Z_1$ represents the impedance of the two-wire port of the hybrid circuit (where bidirectional transmission occurs), and $Z_2$ represents the external impedance connected to the port. Both $Z_1$ and $Z_2$ are complex quantities consisting of both resistive and reactive components.

The return loss given by this formula represents the loss or attenuation between a signal applied to the two-wire port of the hybrid circuit and a signal received from the same port; however, it is also approximately correct for transhybrid loss, which is a measure of the coupling between the four-wire ports of the hybrid circuit (i.e., between the receive port 34 and the transmit port 23 in the present example). $Z_1$ represents the impedance at the two-wire port for which the hybrid circuit is perfectly balanced. A perfectly balanced hybrid shows no signal feedthrough between the two four-wire ports. $Z_2$ represents the external impedance that is connected to the two-wire port of the hybrid circuit, and in the present example is provided either by the impedance of the subscriber line or central office switch port (during non-loopback operation) or by a separate applied external impedance (during loopback operation).

When $Z_1$ and $Z_2$ are equal, the hybrid circuit is perfectly balanced and the transhybrid loss is infinite. This is the desired condition for normal (non-loopback) operation of the channel unit. If $Z_2$ is either infinite or zero (as it is during loopback operation in the open-circuit and short-circuit embodiments of FIGS. 1 and 5, respectively), the transhybrid loss is equal to 0 dB and complete coupling occurs between the receive and transmit ports of the hybrid circuit. During normal (non-loopback) operation of the channel unit, usable transhybrid loss values are in the range of approximately 8 dB to infinity.

Although a transhybrid loss of 0 dB is preferred for loopback testing, the selection of a value of $Z_2$ that produces any transhybrid loss of significantly less than about 8 dB will still allow loopback mode operation. This condition will be met if $Z_2$ is greater (or less) than $Z_1$ by factor of at least approximately 2.3 in the loopback mode. Preferably, however, $Z_2$ is made greater (or less) than $Z_1$ by a factor of at least 10 during loopback mode operation. Applying the previous formula, and assuming that $Z_2$ is ten times greater than the value of $Z_1$, a transhybrid loss value of 1.7 dB results. (The same result is obtained if $Z_2$ is made less than $Z_1$ by a factor of ten.) A transhybrid loss of 1.7 dB is acceptable for loopback testing, although the loss can be further reduced by increasing the difference between $Z_2$ and $Z_1$ during loopback mode operation.

It will be understood that various types of circuit arrangements can be employed to connect the desired value of $Z_2$ to the transmit/receive port 17 of the hybrid circuit 18 during loopback testing. These circuit arrangements will typically consist of relays and impedance elements (including both resistive and reactive elements) which are coupled to the transmit/receive port 17 of the channel unit by the relays during operation in the loopback mode. The subscriber circuit may either be disconnected from the transmit/receive port 17 during loopback testing, or allowed to remain in the circuit as part of the desired loopback impedance $Z_2$.

While the present invention has been illustrated by means of exemplary embodiments thereof, it will be understood by those skilled in the art that various changes and modifications can be made therein. For example, the hybrid circuit 18 need not be of the type described, but may instead be of the solid state (non-transformer) type. Similarly, the relay coils 44 and 56 and relay contacts 40, 42, 54 and 120 may be replaced with solid state devices if desired. These and other changes and modifications are intended to fall within the spirit and scope of the invention as defined in the appended claims.

What is claimed is:

1. A two-wire channel unit for use in a digital loop carrier telecommunications system, comprising:

a two-wire subscriber line interface for connecting said channel unit to a two-wire subscriber line;

a common equipment interface for connecting said channel unit to channel bank common equipment in a digital loop carrier channel bank;

a processing circuit connected to said common equipment interface for converting signals from said subscriber line to a format suitable for said channel bank common equipment, and for converting signals from said channel bank common equipment to a format suitable for said subscriber line;

a hybrid circuit having a two-wire transmit/receive port, a two-wire transmit port, and two-wire receive port, said two-wire transmit/receive port being connected to said two-wire subscriber line interface;

a transmit circuit connected between said two-wire transmit port of said hybrid circuit and an input of said processing circuit;

a receive circuit connected between an output of said processing circuit and said two-wire receive port of said hybrid circuit; and a loopback circuit for coupling test signals from said receive circuit to said transmit circuit through said hybrid circuit when said channel unit is placed in a loopback test mode;

wherein at least one of said transmit and receive circuits has a variable gain, and wherein said loopback circuit is connected to said at least one of said transmit and receive circuits and is operative to change the gain of said transmit or receive circuit when said channel unit is placed in said loopback test mode.

2. A two-wire channel unit as claimed in claim 1, wherein said hybrid circuit is designed to prevent signals from being coupled from said two-wire receive port to said two-wire transmit port when a characteristic impedance is coupled to said two-wire transmit/receive port, and wherein said loopback circuit is operative in the loopback test mode of said channel unit to change the impedance coupled to said two-wire transmit/receive port of said hybrid circuit to an impedance value at which test signals can be coupled from said two-wire receive port to said two-wire transmit port.

3. A two-wire channel unit as claimed in claim 2, wherein said impedance value is substantially equivalent to an open circuit at the two-wire transmit/receive port of said hybrid circuit.

4. A two-wire channel unit as claimed in claim 3, wherein said loopback circuit includes normally-closed switch contacts in series with at least one side of said two-wire subscriber line, said switch contacts when open causing said channel unit to be placed in said loopback test mode.

5. A two-wire channel unit as claimed in claim 4, wherein normally-closed switch contacts are provided in series with both sides of said two-wire subscriber line to isolate said channel unit from said subscriber line when said channel unit is placed in said loopback test mode.

6. A two-wire channel unit as claimed in claim 4, wherein said normally-closed switch contacts comprise relay contacts, and further comprising:
  a relay coil for actuating said relay contacts; and
  a loopback detector having an output connected to said relay coil for energizing said relay coil to open said relay contacts in response to a loopback test initiation signal.

7. A two-wire channel unit as claimed in claim 6, wherein said loopback detector has an input connected to said processing circuit for receiving said loopback test initiation signal from said channel back common equipment.

8. A two-wire channel unit as claimed in claim 6, further comprising a driver circuit connected between the output of said loopback detector and said relay coil.

9. A two-wire channel unit as claimed in claim 2, wherein said impedance value is substantially equivalent to a short circuit across the transmit receive port of said hybrid circuit.

10. A two-wire channel unit as claimed in claim 9, wherein said loopback circuit includes normally-open switch contacts connected across the two-wire transmit/receive port of said hybrid circuit, said switch contacts when closed causing said channel unit to be placed in said loopback test mode.

11. A two-wire channel unit as claimed in claim 10, wherein said normally-open switch contacts comprise relay contacts, and further comprising:
  a relay coil for actuating said relay contacts; and
  a loopback detector having an output connected to said relay coil for energizing said relay coil to close said relay contacts in response to a loopback test initiation signal.

12. A two-wire channel unit as claimed in claim 11, wherein said loopback detector has an input connected to said processing circuit for receiving said loopback test initiation signal from said channel bank common equipment.

13. A two-wire channel unit as claimed in claim 11, further comprising a driver circuit connected between the output of said loopback detector and said relay coil.

14. A two-wire channel unit as claimed in claim 1, wherein at least one of said transmit and receive circuits has a selectively variable gain, and wherein said loopback circuit is connected to said at least one of said transmit and receive circuits and is operative to selectively vary the gain of said transmit or receive circuit when said channel unit is placed in said loopback test mode.

15. A two-wire channel unit as claimed in claim 1, wherein said at least one of said transmit and receive circuits comprises an amplifier having a resistive feedback loop, and wherein said loopback circuit is operative to change the resistance value of said resistive feedback loop in order to vary the gain of said transmit or receive circuit when said channel unit is placed in said loopback test mode.

16. A two-wire channel unit for use in a digital loop carrier telecommunications system, comprising:
  a two-wire subscriber line interface for connecting said channel unit to a two-wire subscriber line;
  a common equipment interface for connecting said channel unit to channel bank common equipment in a digital loop carrier channel bank;
  a processing circuit connected to said common equipment interface for converting signals from said subscriber line to a format suitable for said channel bank common equipment, and for converting signals from said channel bank common equipment to a format suitable for said subscriber line;
  a hybrid circuit having a two-wire transmit/receive port, a two-wire transmit port, and two-wire receive port, said two-wire transmit/receive port being connected to said two-wire subscriber line interface;
  a transmit circuit connected between said two-wire transmit port of said hybrid circuit and an input of said processing circuit;
  a receive circuit connected between an output of said processing circuit and said two-wire receive port of said hybrid circuit; and
  a loopback circuit for coupling test signals from said receive circuit to said transmit circuit when said channel unit is placed in a loopback test mode;
  wherein at least one of said transmit and receive circuits has a variable gain, and wherein said loopback circuit is connected to said at least one of said transmit and receive circuits and is operative to vary the gain of said transmit or receive circuit when said channel unit is placed in said loopback test mode.

17. A two-wire channel unit as claimed in claim 16, wherein said at least one of said transmit and receive circuits comprises an amplifier having a resistive feedback loop, and wherein said loopback circuit is operative to change the resistance value of said resistance feedback loop in order to vary the gain of said transmit or receive circuit when said channel unit is placed in said loopback test mode.

18. A two-wire channel unit as claimed in claim 17, wherein said loopback circuit includes switch contacts in said resistive feedback loop to connect or disconnect a resistance in said feedback loop in order to change said resistance value.

19. A method for implementing loopback testing in a two-wire channel unit having a hybrid circuit for coupling a two-wire subscriber line to separate two-wire transmit and receive circuits in said channel unit, said hybrid circuit having a two-wire transmit/receive port for connection to said two-wire subscriber line and being designed to prevent signals from being coupled from said receive circuit to said transmit circuit when a characteristic impedance is coupled to said transmit/receive port, said method comprising the steps of:
  placing said two-wire channel unit in a loopback test mode by changing the impedance coupled to said transmit/receive port of said hybrid circuit to an impedance value at which test signals can be coupled from said receive circuit to said transmit circuit through said hybrid circuit; and changing the gain of at least one of said transmit and receive circuits when said channel unit is placed in said loopback test mode.

20. A method as claimed in claim 19, further comprising the step of changing the gain of at least one of said transmit and receive circuits when said channel unit is placed in loopback test mode.

21. A method as claimed in claim 19, wherein the step of changing the gain of said transmit or receiver circuit comprises changing a resistance value in a resistive feedback loop of an amplifier included in said transmit or receive circuit.

22. A method as claimed in claim 21, wherein the step of changing said resistance value in said resistive feedback loop includes the step of connecting or disconnecting a resistance in said feedback loop.

\* \* \* \* \*